(12) United States Patent
Skurich et al.

(10) Patent No.: US 11,472,232 B2
(45) Date of Patent: Oct. 18, 2022

(54) TIRE WITH TREAD ELEMENTS INCLUDING DUAL ANGLED CHAMFER

(71) Applicant: The Goodyear Tire & Rubber Company, Akron, OH (US)

(72) Inventors: Michael Stefan Skurich, North Canton, OH (US); Zachary William Juergens, Canton, OH (US); Jeremy Lee Roberts, Hartville, OH (US); Jung Wan Cho, Hudson, OH (US); Gregory Marvin Strach, Stow, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 275 days.

(21) Appl. No.: 16/718,754

(22) Filed: Dec. 18, 2019

(65) Prior Publication Data

US 2021/0188010 A1 Jun. 24, 2021

(51) Int. Cl.
*B60C 11/13* (2006.01)
*B60C 11/11* (2006.01)

(52) U.S. Cl.
CPC ............ *B60C 11/1392* (2013.01); *B60C 11/11* (2013.01); *B60C 2011/133* (2013.01)

(58) Field of Classification Search
CPC ............. B60C 11/1307; B60C 11/1315; B60C 11/1392; B60C 2011/133
See application file for complete search history.

(56) References Cited

U.S. PATENT DOCUMENTS

| 5,109,903 | A | | 5/1992 | Watanabe et al. |
| 5,456,301 | A | * | 10/1995 | Wise ............. B60C 11/1392 |
| | | | | 152/209.15 |
| 5,733,393 | A | | 3/1998 | Hubbell et al. |
| 6,138,728 | A | | 10/2000 | Miyazaki |
| 6,520,230 | B1 | | 2/2003 | Ratliff, Jr. |
| 6,910,512 | B1 | | 6/2005 | Takahashi |
| 6,968,881 | B2 | | 11/2005 | Ratliff, Jr. et al. |

(Continued)

FOREIGN PATENT DOCUMENTS

| DE | 102010017010 A1 | | 11/2011 |
| JP | H03-132403 | * | 6/1991 |

(Continued)

OTHER PUBLICATIONS

English machine translation of JP2019-043306. (Year: 2019).*
English machine translation of JPH03-132403. (Year: 1991).*
EPO search report dated Mar. 18, 2021.

*Primary Examiner* — Robert C Dye
(74) *Attorney, Agent, or Firm* — Edward T. Kennedy

(57) ABSTRACT

A tire includes a tread formed with tread elements that include a dual angled chamfer. The tire includes a pair of sidewalls extending radially outward to a ground-engaging tread. A plurality of circumferentially-extending grooves extend about the tread and define a plurality of ribs. A plurality of laterally-extending grooves cooperate with the circumferential grooves to divide the ribs into tread elements. A plurality of selected tread elements are formed with a dual angled chamfer. Each of the selected tread elements includes a body, a radially outer, ground-engaging surface, a chamfer side, and a dual angled chamfer that is formed in the body between the ground-engaging surface and the chamfer side.

16 Claims, 6 Drawing Sheets

(56) References Cited

U.S. PATENT DOCUMENTS

| | | |
|---|---|---|
| 6,983,777 B2 | 1/2006 | Ratliff, Jr. |
| 7,143,798 B2 | 12/2006 | Ratliff, Jr. |
| 7,347,238 B2 | 3/2008 | Miyasaka |
| 8,925,601 B2 | 1/2015 | Kawauchi |
| 9,079,459 B2 | 7/2015 | Dumigan |
| 10,266,012 B2 | 4/2019 | Hayashi |
| 10,414,211 B2 | 9/2019 | Yamaoka |
| 2005/0167021 A1* | 8/2005 | Takahashi ............... B60C 11/13 152/209.15 |
| 2014/0158261 A1* | 6/2014 | Takahashi ........... B60C 11/0306 152/209.1 |
| 2014/0338804 A1* | 11/2014 | Takano ............... B60C 11/0309 152/209.18 |
| 2020/0156417 A1* | 5/2020 | Speziari ............. B60C 11/1392 |

FOREIGN PATENT DOCUMENTS

| | | | |
|---|---|---|---|
| JP | 03-186406 | * | 8/1991 |
| JP | 2019-043306 | * | 3/2019 |

* cited by examiner

TIRE WITH TREAD ELEMENTS INCLUDING DUAL ANGLED CHAMFER

FIELD OF THE INVENTION

The invention relates to pneumatic tires and to features of treads for such tires. More particularly, the invention is directed to a tire with a tread that is formed with tread elements that include a dual angled chamfer for improving braking performance in dry and wet conditions, while also improving performance in winter conditions.

BACKGROUND OF THE INVENTION

A pneumatic tire is formed with a ground-contacting tread. The tread provides the traction for the tire, and in turn, for the vehicle that the tire supports. A tread is typically formed with grooves, which are elongated void areas that extend in circumferential, lateral and/or angled manners about the tread in various configurations. The grooves define tread elements or tread blocks, which are block elements that include the ground-engaging surface. For the purpose of convenience, the terms tread element and tread block may be used interchangeably.

In the prior art, tread blocks were formed with ninety-degree edges, which are known as squared tread blocks. During braking of the vehicle, a leading edge of a squared tread block tends to dig into the road surface, while the ground-engaging area of the tread block behind the leading edge tends to lose contact with the ground as the block deforms or buckles from braking forces. Such behavior is often beneficial for braking on ice or snow in winter conditions. However, because the full ground-engaging area of the tread block is not employed, performance of squared tread blocks and thus the tire may be sacrificed in wet or dry conditions.

In order to improve the performance of squared tread blocks, tread blocks with a single forty-five (45) degree chamfer at the surface edges, or rounded surface edges, were developed. Such chamfered tread blocks have reduced the tendency of the leading edge of the tread block to dig into the road surface, enabling the ground-engaging area of the tread blocks behind the leading edge to retain contact with the ground as the blocks deform from braking forces. However, the chamfer reduces the edge effect of squared tread blocks, which is the tendency of the leading edge of the tread block to dig into the road surface, thereby undesirably decreasing performance of the tire in winter conditions.

As a result, there is a need in the art for a tire with a tread that is formed with features that enable improved braking performance in wet and dry conditions, while also improving performance in winter conditions.

SUMMARY OF THE INVENTION

According to an aspect of an exemplary embodiment of the invention, a tire includes a tread formed with tread elements that include a dual angled chamfer. The tire includes a pair of sidewalls extending radially outward to a ground-engaging tread. A plurality of circumferentially-extending grooves extend about the tread and define a plurality of ribs. A plurality of laterally-extending grooves cooperate with the circumferential grooves to divide the ribs into tread elements. A plurality of selected tread elements are formed with a dual angled chamfer. Each of the selected tread elements includes a body, a radially outer, ground-engaging surface, a chamfer side, and a dual angled chamfer that is formed in the body between the ground-engaging surface and the chamfer side.

DEFINITIONS

The following definitions are applicable to the present invention.

"Axial" and "axially" mean lines or directions that are parallel to the axis of rotation of the tire.

"Circumferential" means lines or directions extending along the perimeter of the surface of the annular tread perpendicular to the axial direction.

"Equatorial plane" means the plane perpendicular to the axis of rotation of the tire and passing through the center of the tire tread.

"Footprint" means the contact patch or area of contact created by the tire tread with a flat surface as the tire rotates or rolls.

"Groove" means an elongated void area in a tread that may extend in a circumferential, lateral or angled manner about the tread in a straight, curved, or zigzag configuration.

"Inboard side" means the side of the tire nearest the vehicle when the tire is mounted on a wheel and the wheel is mounted on the vehicle.

"Inner" means toward the inside of the tire.

"Lateral" and "laterally" are used to indicate axial directions across the tread of the tire.

"Outboard side" means the side of the tire farthest away from the vehicle when the tire is mounted on a wheel and the wheel is mounted on the vehicle.

"Outer" means toward the outside of the tire.

"Radial" and "radially" are used to mean directions radially toward or away from the axis of rotation of the tire.

"Rib" means a circumferentially extending strip of rubber on the tread which is defined by at least one circumferential groove and either a second such groove or a lateral edge, the strip being laterally undivided by full-depth grooves.

"Tread" means a molded rubber component which includes that portion of the tire that comes into contact with the road when the tire is normally inflated and under normal load. The tread has a depth conventionally measured from the tread outer surface to the bottom of the deepest groove of the tire.

"Tread block" or "Tread element" means a rib or a block element defined by a shape having adjacent grooves.

BRIEF DESCRIPTION OF THE DRAWINGS

The invention will be described by way of example and with reference to the accompanying drawings, in which.

Similar numerals refer to similar parts throughout the drawings.

DETAILED DESCRIPTION OF THE INVENTION

By way of introduction of the tire including a tread formed with dual angled chamfer tread elements of the present invention, FIGS. 1 and 2A through 2C show tread elements or blocks of the prior art.

Figure 2A:
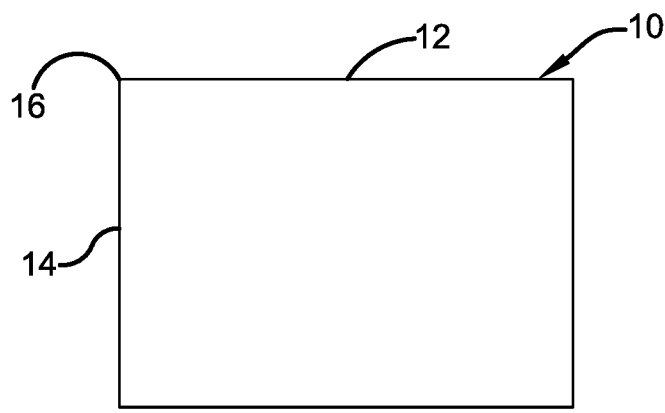
FIG. 2A is a cross-sectional view of a portion of a first prior art tread block or element.
Figure 2B:
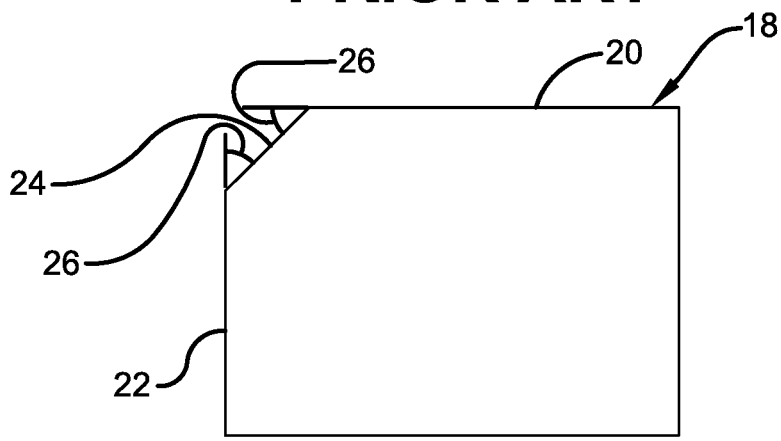
FIG. 2B is a cross-sectional view of a portion of a second prior art tread block or element.
Figure 2C:
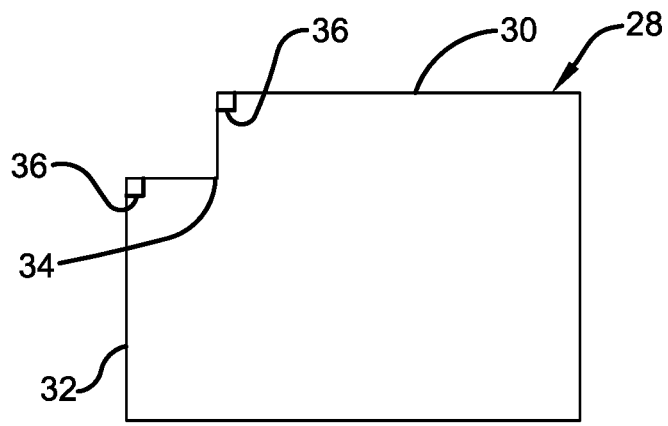
FIG. 2C is a cross-sectional view of a portion of a third prior art tread block or element.

FIG. 2A shows a first prior art tread block 10 that includes a ground-engaging surface 12, a side 14 and a ninety (90) degree edge 16 between the ground engaging surface and the side. FIG. 2B shows a second prior art tread block 18 that includes a ground-engaging surface 20, a side 22 and a chamfer 24 formed at a forty-five (45) degree angle 26 relative to the ground-engaging surface and the side. FIG. 2C shows a third prior art tread block 28 that includes a ground-engaging surface 30, a side 32 and a chamfer 34 formed at a ninety (90) degree angle 36 relative to the ground-engaging surface and the side.

Figure 1:
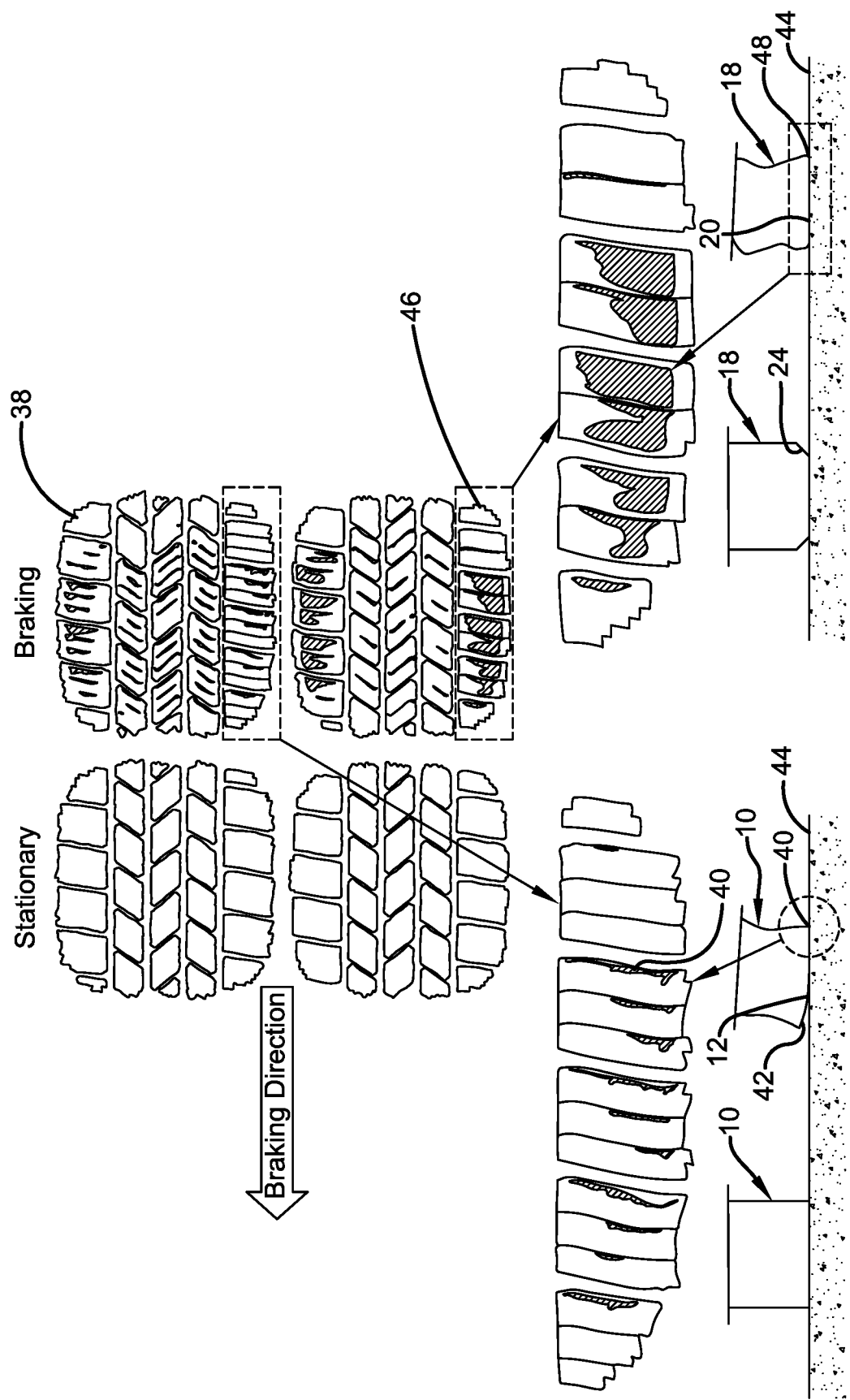
FIG. 1 is a schematic representation of the behavior of prior art tread blocks or elements.

FIG. 1 shows the behavior of the first prior art tread block 10 and the second prior art tread block 18. More particularly, a tire footprint 38 shows that a leading edge 40 of the first tread block 10 digs into a road surface 44 during braking, while an area 42 of the ground-engaging surface 12 disposed behind the leading edge loses contact with the ground surface due to deformation of the block from braking forces. As described above, such behavior is often beneficial for braking on ice or snow, but may sacrifice performance in wet or dry conditions due to lack of contact of the area 42 behind the leading edge 40 with the ground surface 44.

A tire footprint 46 shows that a leading edge 48 of the second tread block 18 does not dig into the road surface 44 during braking nearly as much as the leading edge 40 of the first tread block 10. Rather, due to the chamfer 24, the ground-engaging surface area 20 of the second tread block 18 retains contact with the ground surface 44 as the tread block deforms from braking forces. As described above, the reduced tendency of the leading edge 48 to dig into the road surface 44, while performing well in wet or dry conditions, may decrease performance in winter conditions. The third prior art tread block 28 (FIG. 2C) tends to perform in a manner similar to that of the second tread block 18.

Figure 3:
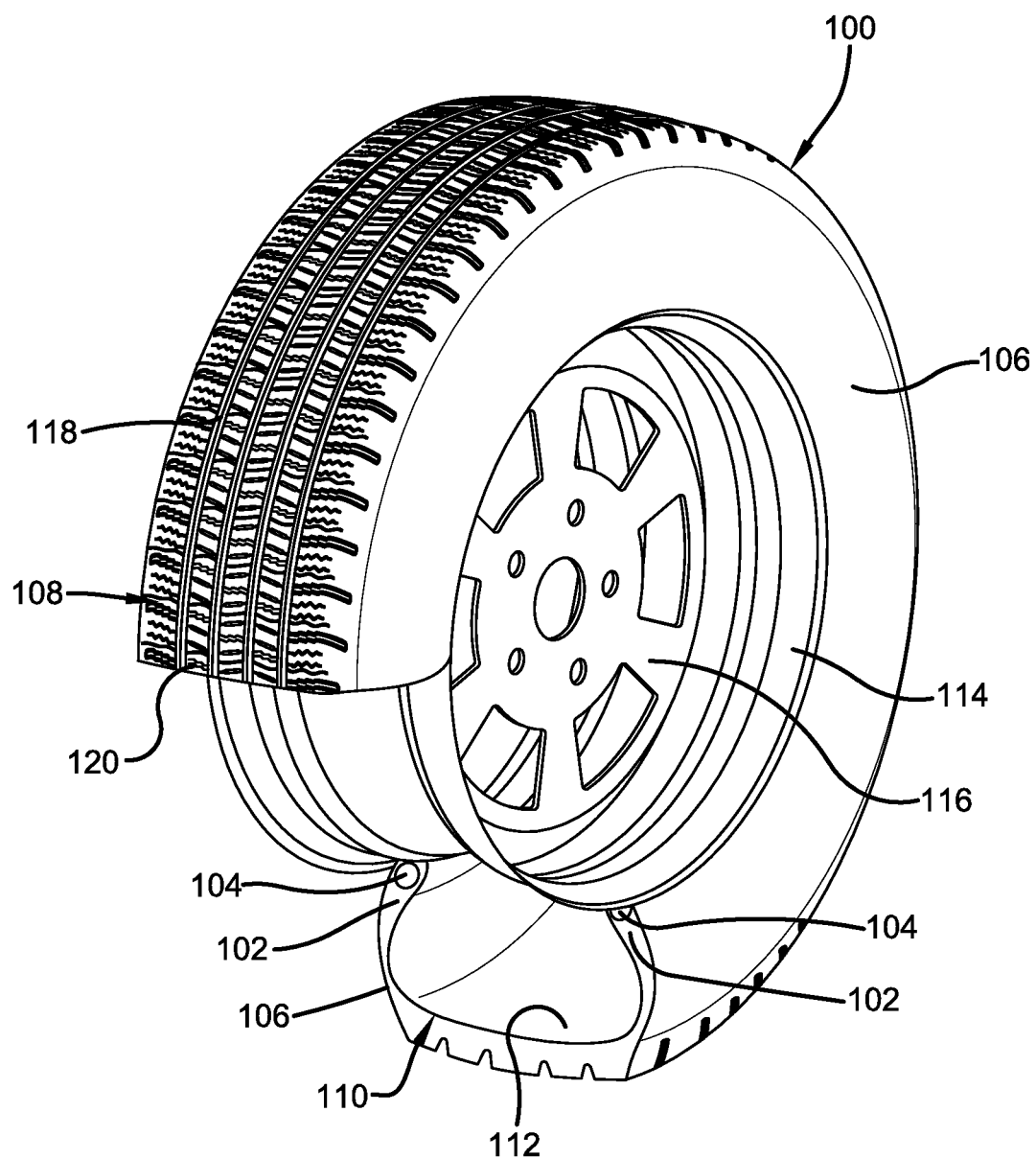
FIG. 3 is a perspective view, partially in section, of an exemplary embodiment of a tire including a tread formed with dual angled chamfer tread elements of the present invention.

Turning now to FIGS. 3 through 8, an exemplary embodiment of a tire including a tread formed with dual angled chamfer tread elements of the present invention is indicated at 100. As shown in FIG. 3, the tire 100 includes a pair of bead areas 102, each one of which is formed with a bead core 104 that is embedded in the respective bead areas. Each one of a pair of sidewalls 106 extends radially outward from a respective bead area 102 to a ground-contacting or ground-engaging tread 108. The tire 100 is reinforced by a carcass 110 that toroidally extends from one bead area 102 to the other bead area, as known to those skilled in the art. An innerliner 112 is formed on the inner or inside surface of the carcass 110. The tire 100 is mounted on the flange 114 of a wheel or rim 116, as known in the art.

Figure 4:
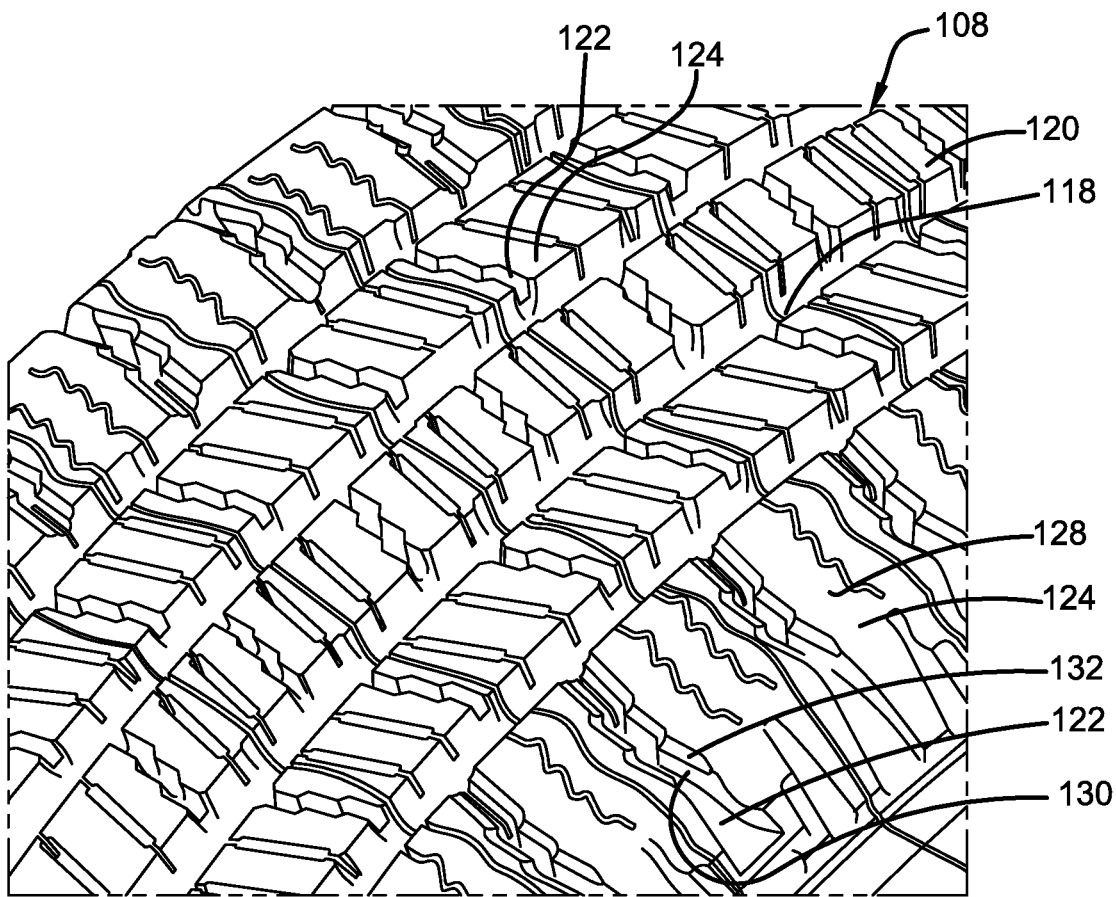
FIG. 4 is an enlarged fragmentary perspective view of a portion of the tire shown in FIG. 3.
Figure 5:
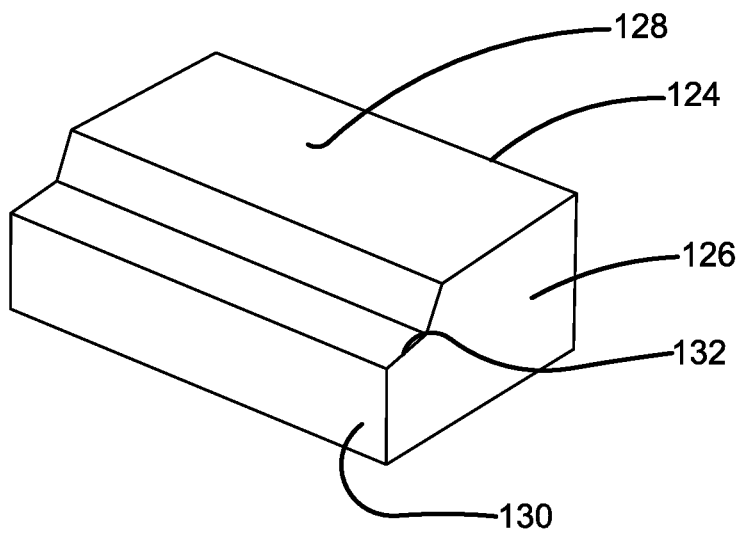
FIG. 5 is an enlarged fragmentary perspective view of a portion of a tread element from the circled area in FIG. 4.
Figure 6:
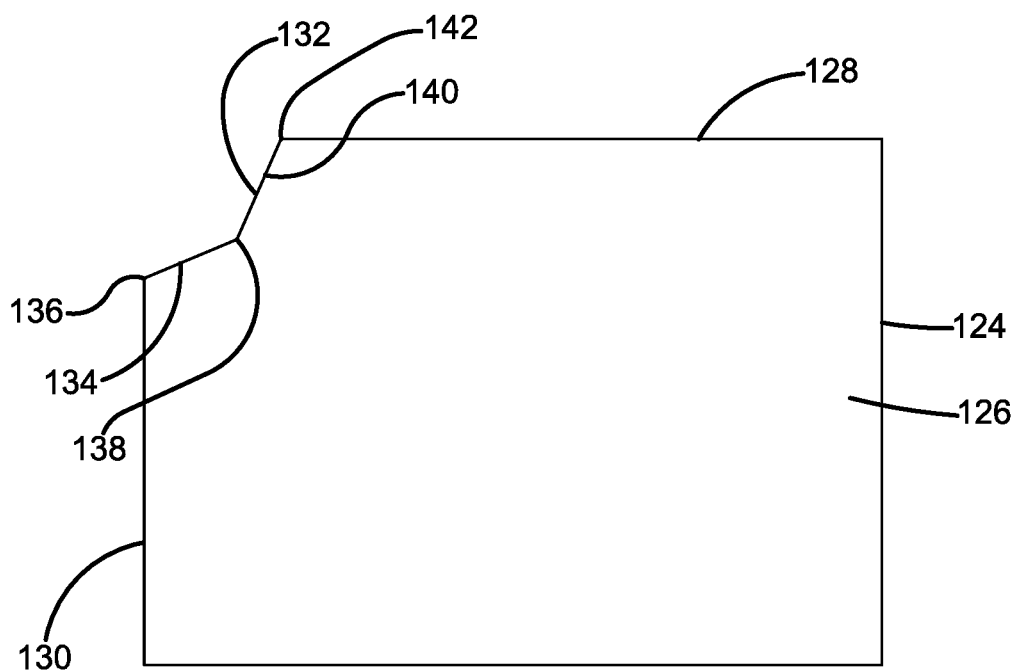
FIG. 6 is an end view of the portion of the tread element shown in FIG. 5.
Figure 7:
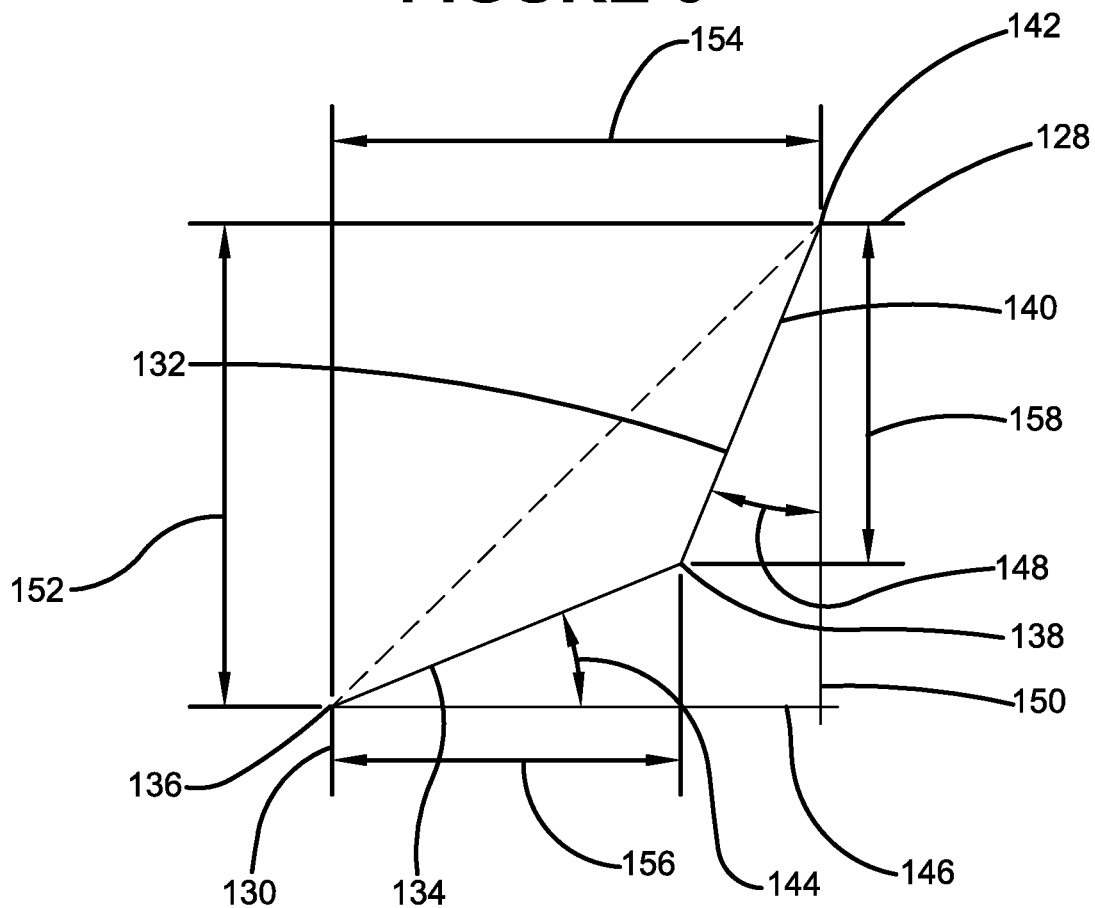
FIG. 7 is an enlarged cross-sectional view of a portion of the chamfer area of the tread element shown in FIG. 5.

Referring to FIGS. 4 and 5, circumferentially-extending grooves 118 extend about the tread 108 and define a plurality of ribs 120. Laterally-extending grooves 122 extend in a generally lateral direction across the tread 108 and cooperate with the circumferential grooves 118 to divide the ribs 120 into tread elements or tread blocks 124. The laterally-extending or lateral grooves 122 may extend laterally parallel to the axial direction of the tire 100, or laterally at an angle under about 45 degrees relative to the axial direction of the tire. Each tread element 124 includes a body 126, a radially outer, ground-engaging surface 128 and a chamfer side 130.

The chamfer side 130 may be adjacent a respective lateral groove 122 or a respective circumferential groove 118, and preferably is adjacent a lateral groove. In addition, the chamfer side 130 may be formed on one or more of the geometric sides of the tread element 124. For the purpose of convenience, reference shall be made to a single chamfer side 130 that is adjacent a respective lateral groove 122, with the understanding that such reference may include multiple sides as well as sides adjacent a respective circumferential groove 118.

A dual angled chamfer 132 is formed in the body 126 between the ground-engaging surface 128 and the chamfer side 130. More particularly, turning to FIGS. 6 and 7, the dual angled chamfer 132 includes a first line 134 extending from a first point 136 on the chamfer side 130 to a terminus 138, and a second line 140 extending from a second point 142 on the surface 128 to the terminus. The terminus 138 is the point at which the first line 134 and the second line 140 meet. The first line 134 extends from the first point 136 to the terminus 138 at an angle 144 between about 20 and about 25 degrees, and preferably about 22.5 degrees, relative to a line 146 that extends parallel to the ground-engaging surface 128. The second line 140 extends from the second point 142 to the terminus 138 at an angle 148 between about 20 and about 25 degrees, and preferably about 22.5 degrees, relative to a line 150 that extends parallel to the chamfer side 130.

The dual angled chamfer 132 extends in a radially outward direction from the first point 136 towards the surface 128 for a distance 152 that may be from about 1 millimeter to about 2 millimeters, and preferably is 2 millimeters. The dual angled chamfer 132 extends in an axial direction from the second point 142 towards the chamfer side 130 for a distance 154 that may be from about 1 millimeter to about 2 millimeters, and preferably is 2 millimeters.

Preferably, a length 156 of the first line 134, measured from the first point 136 to the terminus 138, is about 70 percent of the axial distance 154 of the dual angled chamfer 132. When the axial distance 154 of the dual angled chamfer 132 is about 2 millimeters, the length 156 of the first line 134 thus is about 1.4 millimeters. In addition, a length 158 of the second line 140, measured from the second point 142 to the terminus 138, preferably is about 70 percent of the radial distance 152 of the dual angled chamfer 132. When the radial distance 152 of the dual angled chamfer is about 2 millimeters, the length 158 of the second line 140 thus is about 1.4 millimeters.

Figure 8:
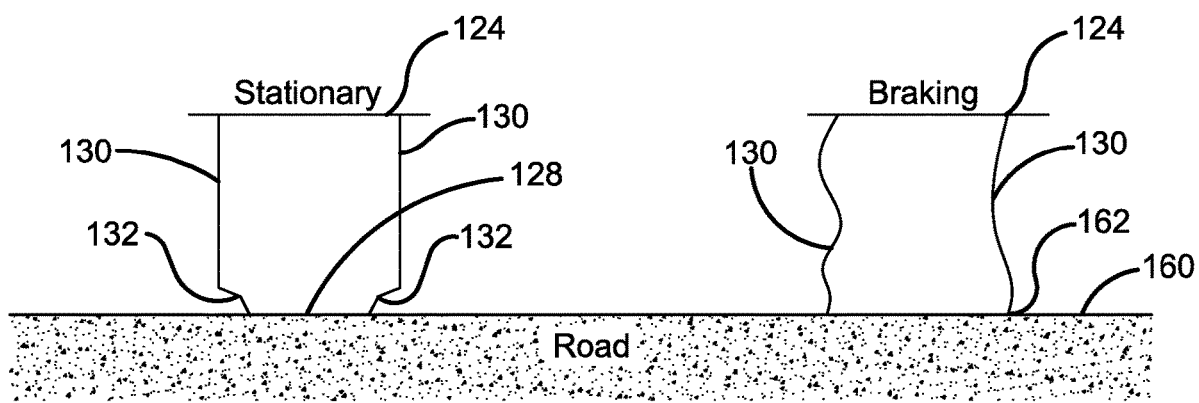
FIG. 8 is a schematic representation of the behavior of the dual angled chamfer tread elements shown in FIGS. 3 through 7.

Turning to FIG. 8, when the tread element 124 is in contact with a road surface 162, the dual angle chamfer 132 prevents a leading edge 162 of the tread element from digging into the road surface during braking. The dual angle chamfer 132 thus enables the outer surface of the tread element 124 to maintain even pressure and contact on the road surface 160, thus using the whole tread element for braking. In addition, the dual angle chamfer 132 provides a sharper edge for the leading edge 162 than a prior art chamfer, which improves performance on snow and ice in winter conditions, and helps to break water film for improved wet performance.

In this manner, the tire including a tread formed with dual angled chamfer tread elements 100 of the present invention provides features that enable improved braking performance in dry and wet conditions, while also improving performance in winter conditions. The tread elements 124 with a dual angled chamfer 132 reduce edge effect and tread block deformation to improve braking performance. When formed in a side 130 of the tread element 124 adjacent a lateral groove 122, the location and configuration of the dual angled chamfer 132 has a significant impact on the tread elements during braking, due to the load transfer from increased shoulder pressure. In addition, the dual angled chamfer 132 provides some additional initial voids in the pattern of the tread 108, which may be beneficial for traction of the tire 100 in wet conditions and winter or snow and ice conditions.

The present invention also includes a method of forming a tire including a tread having dual angled chamfer tread elements 100, and a method of using a tire including a tread formed with dual angled chamfer tread elements. Each method includes steps in accordance with the description that is presented above and shown in FIGS. 3 through 8.

It is to be understood that the structure of the above-described tire including a tread formed with dual angled chamfer tread elements of the present invention 100 may be altered or rearranged, or components or steps known to those skilled in the art omitted or added, without affecting the overall concept or operation of the invention.

The invention has been described with reference to a preferred embodiment. Potential modifications and alterations will occur to others upon a reading and understanding of this description. It is to be understood that all such modifications and alterations are included in the scope of the invention as set forth in the appended claims, or the equivalents thereof.

What is claimed is:

1. A tire with a tread formed with tread elements including a dual angled chamfer, the tire comprising:
    a pair of sidewalls extending radially outward to a ground-engaging tread;
    a plurality of circumferentially-extending grooves extending about the tread defining a plurality of ribs;
    a plurality of laterally-extending grooves cooperating with the circumferential grooves to divide the ribs into tread elements; and
    a plurality of selected tread elements being formed with a dual angled chamfer, wherein each of the selected tread elements includes:
    a body;
    a radially outer, ground-engaging surface;
    a chamfer side; and
    a dual angled chamfer being formed in the body between the ground-engaging surface and the chamfer side, wherein the dual angled chamfer includes a first line extending from a first point on the chamfer side to a terminus, and a second line extending from a second point on the ground-engaging surface to the terminus, wherein the first line extends from the first point to the terminus at an angle between about 20 and about 25 degrees relative to a line that extends parallel to the ground-engaging surface, wherein a length of the first line is about 70 percent of the axial distance of the dual angled chamfer, and wherein the second line extends from the second point to the terminus at an angle between about 20 and about 25 degrees relative to a line that extends parallel to the chamfer side.

2. The tire of claim 1, wherein the first line extends from the first point to the terminus at an angle about 22.5 degrees relative to a line that extends parallel to the ground-engaging surface.

3. The tire of claim 1, wherein the second line extends from the second point to the terminus at an angle about 22.5 degrees relative to a line that extends parallel to the chamfer side.

4. The tire of claim 1, wherein the chamfer side is adjacent a respective lateral groove.

5. The tire of claim 1, wherein the chamfer side is adjacent a circumferential groove.

6. The tire of claim 1, wherein each of the selected tread elements is formed with a plurality of dual angled chamfers.

7. The tire of claim 1, wherein the laterally-extending grooves extend laterally parallel to an axial direction of the tire.

8. The tire of claim 1, wherein the laterally-extending grooves extend laterally at an angle under about 45 degrees relative to an axial direction of the tire.

9. A tire with a tread formed with tread elements including a dual angled chamfer, the tire comprising:
    a pair of sidewalls extending radially outward to a ground-engaging tread;
    a plurality of circumferentially-extending grooves extending about the tread defining a plurality of ribs;
    a plurality of laterally-extending grooves cooperating with the circumferential grooves to divide the ribs into tread elements; and
    a plurality of selected tread elements being formed with a dual angled chamfer, wherein each of the selected tread elements includes:
    a body;
    a radially outer, ground-engaging surface;
    a chamfer side; and
    a dual angled chamfer being formed in the body between the ground-engaging surface and the chamfer side, wherein the dual angled chamfer includes a first line extending from a first point on the chamfer side to a terminus, and a second line extending from a second point on the ground-engaging surface to the terminus, wherein the first line extends from the first point to the terminus at an angle between about 20 and about 25 degrees relative to a line that extends parallel to the ground-engaging surface, wherein the second line extends from the second point to the terminus at an angle between about 20 and about 25 degrees relative to a line that extends parallel to the chamfer side, and wherein a length of the second line is about 70 percent of the radial distance of the dual angled chamfer.

10. The tire of claim 9, wherein the first line extends from the first point to the terminus at an angle about 22.5 degrees relative to a line that extends parallel to the ground-engaging surface.

11. The tire of claim 9, wherein the second line extends from the second point to the terminus at an angle about 22.5 degrees relative to a line that extends parallel to the chamfer side.

12. The tire of claim 9, wherein the chamfer side is adjacent a respective lateral groove.

13. The tire of claim 9, wherein the chamfer side is adjacent a circumferential groove.

14. The tire of claim 9, wherein each of the selected tread elements is formed with a plurality of dual angled chamfers.

15. The tire of claim 9, wherein the laterally-extending grooves extend laterally parallel to an axial direction of the tire.

16. The tire of claim 9, wherein the laterally-extending grooves extend laterally at an angle under about 45 degrees relative to an axial direction of the tire.

\* \* \* \* \*